United States Patent
Fondelius

[11] Patent Number: 6,073,934
[45] Date of Patent: Jun. 13, 2000

[54] MECHANICAL SEAL

[75] Inventor: Johan Fondelius, Stockholm, Sweden

[73] Assignee: ITT Manufacturing Enterprises, Inc., Wilmington, Del.

[21] Appl. No.: 08/956,741

[22] Filed: Oct. 24, 1997

[30] Foreign Application Priority Data

Nov. 14, 1996 [SE] Sweden .................. 9604158-7

[51] Int. Cl.[7] .................. F16J 15/32; F16J 15/34
[52] U.S. Cl. .................................................. 277/400
[58] Field of Search .................................... 277/400

[56] References Cited

U.S. PATENT DOCUMENTS

| | | | |
|---|---|---|---|
| 3,675,935 | 7/1972 | Ludwig et al | 277/400 |
| 3,704,019 | 11/1972 | McHugh | 277/400 |
| 3,767,212 | 10/1973 | Ludwig | 277/400 |
| 3,770,179 | 11/1973 | McHugh | 277/400 X |
| 3,894,741 | 7/1975 | McHugh | 277/400 X |
| 4,290,611 | 9/1981 | Sedy | 277/400 X |
| 4,889,348 | 12/1989 | Amundson et al. | 277/400 X |
| 5,039,113 | 8/1991 | Gardner | 277/400 X |
| 5,058,905 | 10/1991 | Nosowicz et al. | 277/400 X |
| 5,529,315 | 6/1996 | Borrino et al. | 277/400 X |

*Primary Examiner*—Anthony Knight
*Attorney, Agent, or Firm*—Menotti J. Lombardi

[57] ABSTRACT

A sealing arrangement for a pump including an electric motor/generator and a pump housing, said sealing arrangement including: an intermediate barrier liquid chamber; a mechanical face seal positioned between the pump housing and the intermediate barrier liquid chamber; and, a pumping seal positioned between the intermediate barrier liquid chamber and the electric motor/generator such that air is on a first side thereof and liquid contained in the intermediate barrier liquid chamber is on an oppositely disposed second side thereof, the pumping seal being adapted to repump leakage of liquid from the second side to the first side of the pumping seal.

2 Claims, 1 Drawing Sheet

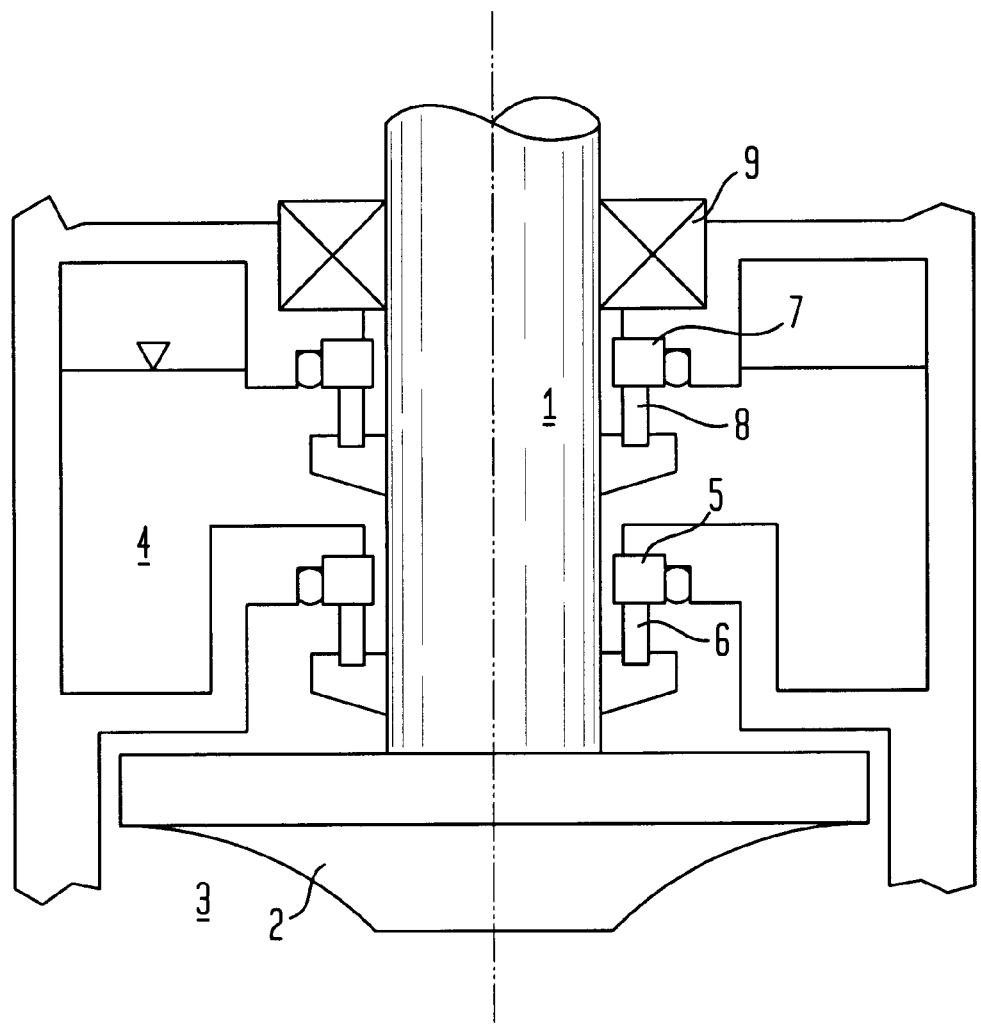

MECHANICAL SEAL

FIELD OF INVENTION

The invention concerns a mechanical seal being a part of a seal arrangement for a submersible machine such as a pump or a mixer.

BACKGROUND OF INVENTION

A machine of this type normally comprises an electric motor and a hydraulic unit having a rotary impeller connected to the motor via a rotary shaft.

In order to prevent the medium within the hydraulic unit from entering along the shaft into the electric motor and damage it, one or several seals are arranged between the hydraulic unit and the electric motor. One common type seal used is a mechanical face seal which consists of one seal ring rotating with the driving shaft and one stationary seal ring attached to the surrounding housing. The two seal rings are pressed towards each other by spring force and prevent in this way liquid from passing between them.

It is however essential that a thin lubricating film is always established between the seal surfaces. This is necessary to prevent the seals from being damaged by dry friction. The consequence is however, that the necessary slot between the two seal surfaces is subject to a certain leakage. This leakage can normally be neglected and is harmless, but sometimes wear, vibrations or a wrong mounting may cause an increased leakage.

If the medium within the hydraulic unit contains contaminations, these may penetrate into the slot between the seal surfaces and cause damage which means that the sealing result is destroyed. It is therefore common to arrange two mechanical seals parted by a room filled by a barrier liquid such as oil. This means that the seal adjacent the electric motor, here called the inner seal, always operates with a clean medium, thus diminishing the risks for damages or the seal surfaces. If the seal adjacent the hydraulic unit, here called the outer seal, should be damaged, medium from the hydraulic unit could penetrate into the barrier liquid, but by checking the quality of said liquid at even intervals, the seal can be repaired before the liquid has been diluted too much. An example of this is shown in the Swedish patent No 366 013.

SUMMARY OF INVENTION

A sealing arrangement for a pump including an electric motor/generator and a pump housing, said sealing arrangement including: an intermediate barrier liquid chamber; a mechanical face seal positioned between the pump housing and the intermediate barrier liquid chamber; and, a pumping seal positioned between the intermediate barrier liquid chamber and the electric motor/generator such that air is on a first side thereof and liquid contained in the intermediate barrier liquid chamber is on an oppositely disposed second side thereof, the pumping seal being adapted to repump leakage of liquid from the second side to the first side of the pumping seal.

BRIEF DESCRIPTION OF THE FIGURES

The sole FIGURE schematically illustrates a mechanical face seal system according to the invention.

DETAILED DESCRIPTION OF THE INVENTION

In order to obtain a seal that is entirely free from leakage a pumping seal can be used an outer seal. Barrier liquid is then pumped out into the hydraulic unit which means that any leakage from the hydraulic unit is prevented. This could be a good solution, but a disadvantage is that barrier liquid must be fed constantly. In addition there is a certain risk that said liquid also could pass the inner seal and cause damage to the electric motor.

The invention is described more closely below with reference to the enclosed drawing which schematically shows a mechanical face seal system according to the invention.

In the drawing 1 stands for a driving shaft between a motor, not shown, and a pump impeller 2 rotating in a pump housing 3. 4 stands for a barrier liquid housing, 5, 6 an outer seal, 7, 8 an inner seal and 9 a bearing.

The purpose of the outer seal 5, 6 is thus to prevent pumped medium within the pump housing 3 from entering the barrier liquid housing 4, while the inner seal 7,8 in a corresponding way is meant to prevent the barrier liquid within the housing 4 from entering the motor capsule via the driving shaft.

In order to secure that liquid will not penetrate into the motor if the inner seal 7, 8 should leak more than expected, the seal is designed in a special way.

The invention is characterized in that a pumping seal is so arranged and located in a seal system comprising two seals and an intermediate barrier liquid housing that an entirely leakage free sealing is obtained without the need for any feeding of barrier liquid.

This is obtained by designing the outer seal, between the hydraulic unit and the barrier liquid housing, like a conventional seal, while the inner seal, between the barrier liquid housing and the motor, is designed like a pumping seal. Said seal, which operates with air on its one side and liquid, the barrier liquid, on its other side, is designed with pressure building grooves on the seal surface. Said grooves start at the air side of the seal and extend inwards in the direction of the liquid side of the seal, however without reaching said liquid side. This creates an unbroken sealing circle adjacent the barrier liquid side which in the normal case acts as a conventional mechanical face seal. If a liquid should penetrate to the air side of the seal, the grooves in the seal surface will immediately start pumping back the liquid into the barrier seal housing, before the leaking liquid has caused any damage.

The invention is thus characterized by the arrangement of a pumping mechanical face seal being positioned between a room containing a liquid and a room containing air. The pumping seal may be designed in different ways. Examples are shown in the Swedish Patent No 960 816-8 and the European Patent No 564 153. Both seal surfaces are provided with shallow grooves which obtain the pumping, while an unbroken seal surface obtains the sealing.

I claim:

1. A seal system for a submersible machine which comprises an electric motor/generator and a hydraulic unit, said seal system comprising two seals and an intermediate barrier liquid room adapted to contain a liquid, wherein at least one of the seals is a mechanical face seal, and the other of said two seals is adjacent the electric motor/generator, interposed between air and liquid contained in said intermediate barrier liquid room, adapted to prevent the liquid in the barrier liquid room from penetrating to the atmosphere in the electric motor/generator, and is a pumping seal having at least one of two seal surfaces that face each other designed with a pressure building geometry which repumps possible leakage of barrier liquid through the seal back to the barrier liquid room.

2. A sealing arrangement for a pump including an electric motor/generator and a pump housing, said sealing arrangement comprising:

an intermediate barrier liquid chamber;

a mechanical face seal interposed between said pump housing and said intermediate barrier liquid chamber; and, a pumping seal interposed between said intermediate barrier liquid chamber and said electric motor/generator such that air is on a first side thereof and liquid contained in said intermediate barrier liquid chamber is on an oppositely disposed second side thereof;

wherein said pumping seal is adapted to repump leakage of said liquid from said first side to said second side of said pumping seal.

* * * * *